Aug. 15, 1967  E. AGUET  3,335,565
GAS TURBINE AND METHOD OF OPERATING SAME
Filed Oct. 14, 1966
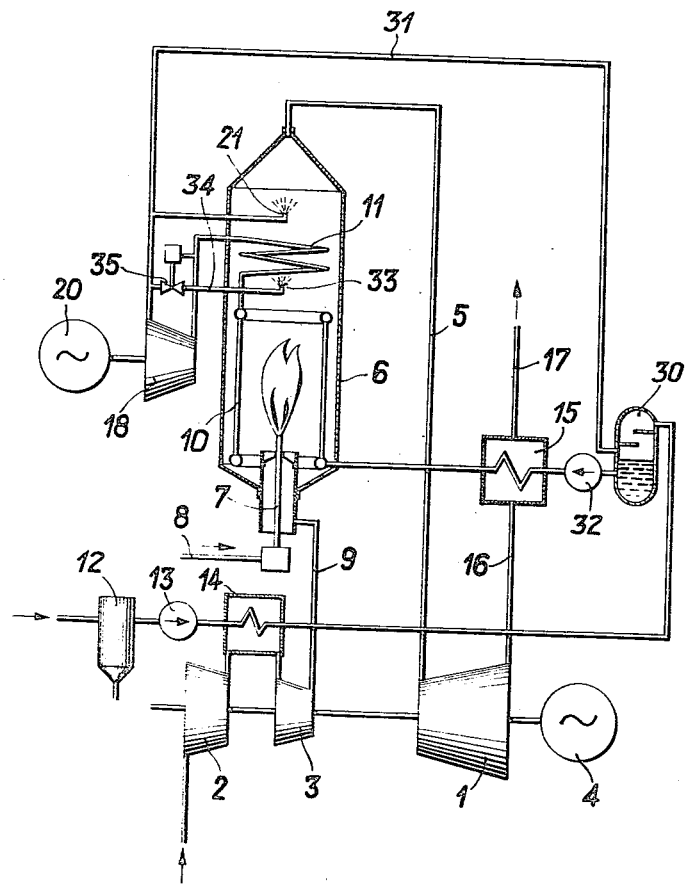
Inventor:
EMILE AGUET
BY
Kenyon & Kenyon
ATTORNEYS

United States Patent Office 3,335,565
Patented Aug. 15, 1967

3,335,565
GAS TURBINE AND METHOD OF OPERATING SAME
Emile Aguet, Winterthur, Switzerland, assignor to Sulzer Brothers Limited, Winterthur, Switzerland, a corporation of Switzerland
Filed Oct. 14, 1966, Ser. No. 586,357
Claims priority, application Switzerland, May 6, 1966, 6,630/66
13 Claims. (Cl. 60—39.05)

This invention relates to a gas turbine plant and a method of operating a gas turbine plant. More particularly, this invention relates to a gas turbine plant having a gas turbine operated by a combustion gas and expanded steam mixture.

Gas turbine plants have been known wherein water is injected into the combustion gases produced in a combustion chamber of the plant for the purpose of achieving a temporary increase of the output and wherein the injected water is evaporated and superheated to perform mechanical work in the gas turbine of the plant. However, such plants have a number of disadvantages. Where water has been injected into the combustion chamber, the combustion in this combustion chamber has been disturbed due to cooling of the flames. Where, on the other hand, water has been injected only at the exit of the combustion chamber, the disadvantage has been eliminated but the combustion chamber has by necessity been operated with a correspondingly higher temperature to ensure that the combustion gases had a sufficiently high temperature for gas expansion after cooling. The amount of water injected has therefore been limited in order to prevent thermal overloading of the combustion chamber. Moreover, the steam generated in this manner has performed a small amount of work relative to the amount of heat required for steam generation causing deterioration of the gas turbine efficiency.

Plants have also been known in which evaporation of water has taken place in an exhaust boiler disposed on the exit at which the combusiton gases leave the gas turbine so that the steam generated has been admixed to the combustion gases entering the gas turbine. Plants of this type have had a higher efficiency but, compared with the output obtained by steam expansion, require boilers having relatively large heating surfaces which are correspondingly expensive. In order to increase the specific output of these exhaust boilers a supplementary furnace has occasionally been provided to increase the temperature of the exhaust gases before contact with the heating surfaces of the boiler. However, since the exhaust gases have a smaller oxygen content than plain air and have been entrained with the amount of steam injected into the gas turbine, even the supplementary furnace cannot increase the temperature in the combustion chamber to the extent which can be done in a conventional steam boiler with a normal firing system. Thus, compared to the amount of steam generated, the heating surfaces have also been large. Finally, such plants have by necessity had at last two combustion chambers with different combustion pressures which renders the fuel injection and regulating plant correspondingly comprehensive and expensive.

Further, in some instances, the combustion chamber of a gas turbine plant has been provided with heating surfaces in the form of a tubed steam generator into which water has been fed for evaporation and superheating. The steam evaporated and superheated in the combustion chamber has then been expanded in a steam turbine, condensed in a condenser and fed anew to the steam generator in the combustion chamber. This plant in particular has suffered from the disadvantage that the steam circuit required a condensation part which increased the costs of the plant. Moreover, the system operated without intermediate superheating, thus resulting in a lower efficiency. If an additional intermediate superheater were introduced in this embodiment, this would require the provision of further heating surfaces which once again would make the plant more expensive.

Generally, the gas turbine plant of the invention which includes a combustion chamber housing a plurality of water conveying heating elements for the evaporation and superheating of the water to steam by combustion gas and a turbine connected to the exit of the combustion chamber is provided with a steam turbine downstream of the heating elements for expanding the superheated steam of the heating elements and a mixing position connected to the steam turbine for injecting the expanded steam into the combustion gas of the combustion chamber upstream of the gas turbine to obtain a gas-stream mixture for introduction into the gas turbine.

According to the invention, steam is generated in the combustion chamber under a pressure higher than the combustion chamber pressure and subsequently expanded in a steam turbine. After leaving the steam turbine the expanded steam is mixed with the combustion gases which enter into the gas turbine for the purposes of expansion. As a result of the expansion in the steam turbine, the steam is correspondingly cooled so that at the exit of the steam turbine it will have a considerably lower temperature than the steam gas mixture which is introduced into the gas turbine. Due to the mixing process the combustion gases are cooled, but the steam is heated, so that the mixing process represents nothing other than an intermediate superheating process for the steam. The steam raising process is therefor accompanied by a first expansion, an intermediate superheating phase and a second expansion so that the aforementioned steam raising process may be regarded as being of a high quality both with respect to output as well as with respect to efficiency, even if the second expansion is confined to an expansion only to atmospheric pressure. An essential feature relative to the plant costs is the fact that intermediate superheating of the steam takes place purely as the result of mixing with the combustion gases without the need for any thermal transfer surfaces. Further, the plant costs are low for the generation of high-pressure steam as the heat is transferred from the hot combustion gases to the steam generating and superheating surfaces at the pressure prevailing in the combustion chamber under very favorable thermal transfer coefficient values which allow small heating surfaces to be used.

The invention dispenses with the need of an expensive condensation part and achieves an intermediate superheating of the steam flowing through the steam turbine in a very simple manner without the need for thermal transfer surfaces. As regards combustion in the combustion chamber, since such is protected according to the invention by the heating surfaces which are flushed with water or steam, it is not necessary to introduce an excessive air surplus into the combustion chamber. Thus, the efficiency of the plant of the invention is further increased over the heretofore used plants. Most important, however, are the low plant costs achieved which render the plants of the invention particularly suitable for peak load power stations, for day or season peaks, particularly for power stations with operating periods of up to 4000 hours per annum.

Further, while other gas turbines have added excess air in amounts at least 5 to 10 times the amount of the theoretic (stoichiometric) air necessary for combustion in order to cool the combustion chamber, the excess air being only heated and discharged through a chimney without participating in the combustion, the combustion gases in the combustion chamber of the invention are cooled to the permissible temperature for entry into the gas turbine by the generation and superheating of steam followed by the admixture of the steam expanded in the steam turbine. Thus, cooling by excess combustion air, a procedure conventionally employed in gas turbines, is no longer required since cooling of the combustion chamber occurs by water and vapor, respectively, and the excess of combustion air to theoretical air can be minimized to the smallest value required to achieve good and complete combustion of the fuel and in any case less than 2:5, the optimal working range being between 1:1 and 1:2. This reduction of the air excess means that for a given amount of fuel injected into the plant the amount of air to be supplied by an air compressor is correspondingly reduced and therefore the power consumed by the compressor is reduced in the same ratio.

Since a mixture of combustion gases and steam is expanded in the gas turbine only a small part of the expansion power developed is consumed for the compression of the combustion air delivered to the combustion chamber. Thus, the expansion power is available practically without reduction as effective output for the steam part of the mixture which, in this case, replaces the excess of combustion air employed in conventional gas turbines. With regard to the power density of the plant, that is, the generated net power measured relative to the turbine dimensions, the invention advantageously provides to a high degree a proportion of steam in the gas steam mixture provided for expansion which is as high as possible and a proportion of excess combustion air which is as small as possible.

In view of the known corrosion hazards to which the heating surfaces of the combustion chamber are exposed, it is of advantage to preheat the water fed in for steam generation to the extent which avoids a drop below the dew point limit. The feed water may therefore be preheated by the admixture of a small proportion of the steam expanded in the steam turbine, the steam being branched off for this purpose from the main steam flow which is provided for admixture with the combustion gases. The cold feed water may be mixed with the steam in a conventional manner in a cascade preheater. Such preheating is of advantage relative to the output and efficiency if the amount of steam used for this purpose performs work in the steam turbine without losing condensation heat with the exhaust gases. The preheating temperature can, of course, reach a value which is no higher than the boiling temperature of the water at the pressure prevailing at the steam turbine exit. Further preheating may, however, be applied by subsequently passing the feed water through a thermal transfer element which is heated by the exhaust gases of the steam turbine before the exhaust gases escape to atmosphere. As a result of preheating the water the mixture will have been preheated to the extent necessary to avoid any danger of dropping below the dew point limit in the thermal transfer element. The thermal transfer element may therefore be constructed as a simple straight-through preheater without the need of any internal water circulation.

Accordingly, it is an object of the invention to provide a gas turbine plant which generates a large mechanical output at minimum plant cost.

It is another object of the invention to superheat the steam of a combustion gas-steam mixture flowing to a gas turbine of a gas turbine plant without use of thermal transfer surface.

It is another object of the invention to reduce the air surplus introduced into the combustion chamber of a gas turbine plant.

It is another object of the invention to provide a low cost method of operating a gas turbine of a gas turbine plant with a mixture of combustion gas and steam.

It is another object of the invention to introduce expanded steam into the combustion gas of a gas turbine plant combustion chamber prior to entry into the gas turbine of the plant.

It is another object of the invention to generate steam in heating elements placed in a combustion chamber wherein the combustion takes place under a pressure much higher than atmospheric, with the effect that the heat transfer rates are much improved and the specific heating surfaces accordingly reduced relatively to those of a conventional steam generator.

These and other objects and advantages of the invention will become more apparent from the following detailed description and appended claims taken in conjunction with the accompanying drawings in which:

The figure illustrates a diagrammatic form of the invention.

Referring to the drawing a gas turbine plant according to the invention includes a gas turbine 1 and a multi-stage compressor having two stages 2 and 3 disposed in a known manner on a common shaft. In addition, an electric generator 4 is coupled to the shaft of the gas turbine 1. The gas turbine 1 is supplied through a pipeline 5 with a mixture of combustion gases and steam obtained from a combustion chamber 6. The combustion chamber has a burner 7 which is supplied through a pipeline 8 with fuel and through a pipeline 9 with compressed air from the second compressor stage 3. The combustion chamber is also provided with a pipe lining which forms an evaporator 10 and a superheater 11.

The evaporator 10 is supplied with water through a plant 12 for the desalination of the feed water, a feed pump 13, a first preheater 14 and a second preheater 15 which are operatively connected to each other. The first preheater 14 also acts as cooler for the compressed air when the air is transferred from the compressor stage 2 into the compressor stage 3. The second preheater 15 is supplied through a pipeline 16 with the exhaust gases of the gas turbine 1 and pass the exhaust gases into a pipeline 17 and a flue, not shown, to be discharged to atmosphere.

On leaving the evaporator 10, the generated steam passes into the superheater 11 and from there is delivered downstream to a steam turbine 18 which drives a generator 20. The generated steam is expanded in the steam turbine 18 and on leaving the steam turbine 18 passes through a pipeline to a mixing position 21 disposed at the exit end of the combustion chamber.

As can be seen from the drawing, the feed line for water may have disposed in it a preheater 30 which is connected through a pipeline 31 to the exit of the turbine 18. The preheater 30 is preferably a cascade preheater in which the expanded steam from the pipeline 31 is mixed with the feed water, the feed water then being supplied to the next preheater 15 by a further feed pump 32.

In addition, a mixing position 33 connected to the exit of the turbine 18 through a pipeline 34 and a thermostatically controlled regulating element 35 which is influenced by the temperature of the steam discharged from the superheater is disposed in the pipeline 34 to serve for the regulation of the steam temperature by controlling the amount of expanded steam introduced into the mixing position 33.

The air provided for combustion may be compressed in the compressor stages 2, 3 to a pressure of 6 atm. abs. The feed water on the other hand may be supplied to the evaporator and superheater at a pressure of, for example, 100 atm. abs. The generated steam may then be expanded in the steam turbine from nearly 100 atm. abs. to approximately 7 atm. abs. since a pressure excess is required for mixing the steam. The temperature conditions are so selected that the temperature of the combustion gases upstream of the mixing position 21 is considerably higher than the temperature of the steam supplied to the mixing position 21. For example, for a temperature of the combustion gases upstream of the mixing position, that is, downstream of the superheater 11, of approximately 1300° C., the temperature of the steam supplied to the mixing position is approximately 170° C. Measures are then taken to obtain a common temperature of approximately 600° C. for the combustion gases and for the steam after the mixing phase. Intermediate superheating of the steam expanded in the steam turbine is thus obtained with a simple means and without heating surfaces.

On leaving the combustion chamber the mixture of combustion gases and superheated steam at a pressure of 6 atm. abs. and a temperature of 600° C. passes into the gas turbine 1 and is expanded to a small value above atmospheric pressure. The expanded mixture then passes through the pipeline 16 into the preheater 15 where part of the heat in the exhaust gases is utilized to heat the feed water. The remaining heat is exhausted through pipeline 17.

It will be understood that the plant described relative to the invention can be simplified. For example, a single-stage turbocompressor without intermediate cooler may be provided. The provision of the preheater 15 is also not absolutely essential for the purpose of the invention. In the same way, it is possible, in simple plants, to dispense with the preheater 30 or with the mixing position 33. The operating pressure in the combustion chamber may, as already mentioned, be selected at a considerably higher value than 6 atm. abs., which value was mentioned in connection with the described example. Also, the temperature of the mixture of combustion gases and superheated steam before entering the gas turbine 1 can be selected at higher values than 600° C.

Plant costs of the invention are distinctly low for the generation of the high-pressure steam. As the heat is transferred from the hot combustion gases to the steam generating and superheating surfaces at the pressure of several atmospheres prevailing in the combustion chamber, the thermal transfer coefficient values are very favorable and the heating surfaces required are correspondingly small.

The combustion pressure prevailing in the combustion chamber can be freely determined in the plant according to the invention. In order to permit the use of gas turbines of commercial construction, the combustion pressure may from the start be selected at a level which is normal in gas turbine construction, that is to say, between 5 and 8 atmospheres. With due reference to the specific plant costs it is, however, of advantage to select this pressure at a higher value, for example, of the order of magnitude of 20 atm. This increases the expansion radiant in the gas turbine and the steam-gas mixture can perform a greater amount of work before escaping to atmosphere. Assuming the same entry temperatures, the exhaust gases discharged from the gas turbine will have a lower temperature and may be discharged directly, that is, without a heat exchanger, into the atmosphere without the thermal exhaust gas losses becoming too serious. With combustion pressures of the kind mentioned hereinbefore, compression of the combustion air is advantageously carried out in at least two stages and the cooling of the compressed air is provided between the two stages. Most of the heat obtained from cooling of the air can be used for preheating of the feed water which is provided for raising the steam. Further preheating is obtained by mixing with part of the amount of steam expanded in the steam turbine.

Basically, the steam expanded in the steam turbine can be mixed with the combustion gases at any desired position between the combustion zone in the combustion chamber and the entry into the gas turbine. In order to keep the heating surfaces in the combustion chamber as small as possible, it is advantageous that the combustion gases which cover these heating surfaces to have as high a temperature as possible. It is appropriate for this reason to mix the combustion gases with the relatively cold steam only after the combustion gases have flowed through the totality of the heating surfaces. On the other hand, by injecting part of the amount of steam into a preceding zone, the temperature of the gas mixture which comes into contact with the heating surfaces can be reduced. This procedure may be advantageous not only in order to avoid high temperature corrosion on certain parts of the heating surfaces which are under particularly severe thermal stresses but also in order to influence the temperature of the superheated steam. For this reason, it is best if two mixing positions are provided of which the first is disposed appropriately in the zone between the evaporator and the steam superheater, the second being disposed in the zone downstream of the steam superheater. The distribution of the amount of steam between the two mixing positions may be regulated by a steam valve which is automatically controlled as a function of the temperature of the superheated steam.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A gas turbine plant comprising
    a combustion chamber having an evaporator and a superheater disposed therein for evaporation and superheating of water to steam,
    feed water means for feeding a flow of water into said evaporator,
    means for introducing combustion air under pressure into said combustion chamber to produce hot combustion gas for heating said evaporator and superheater,
    a gas turbine operatively connected to said combustion chamber downstream thereof,
    a steam turbine operatively connected downstream of said superheater for expanding the superheated steam delivered thereto from said superheater, and
    a mixing position operatively connected to said steam turbine for injecting expanded steam into said combustion chamber upstream of said gas turbine to obtain a mixture of said expanded steam and said combustion gas for introduction into said gas turbine.

2. A gas turbine plant as set forth in claim 1 wherein said means includes a multi-stage compressor for compressing combustion air, and a preheater operatively connected intermediately of the stages of said compressor for passage of compressed air therethrough, said feed water means passing through said preheater whereby the feed water passing through said feed water means acts as a coolant for said compressed air passing through said compressor.

3. A gas turbine plant as set forth in claim 1 which further comprises an exhaust pipeline connected to said gas turbine for exhausting said gas-steam mixture, and a preheater interposed in said exhaust pipeline for passage of said mixture therethrough, said feed water means passing through said preheater whereby said mixture preheats the feed water passing through said feed water means.

4. A gas turbine plant as set forth in claim 1 which further comprises a preheater operatively disposed between said feed water means and said steam turbine for mixing said flow of water with a portion of said expanded steam to preheat said flow of water.

5. A gas turbine plant as set forth in claim 1 wherein said mixing position is disposed downstream of said superheater relative to the direction of flow of said combustion gas.

6. A gas turbine plant as set forth in claim 5 which further comprises a second mixing position operatively connected to said steam turbine for injecting expanded steam into said combustion chamber, said second mixing position being disposed upstream of said superheater.

7. A gas turbine plant as set forth in claim 6 which further comprises a regulating element in said second mixing position for controlling the flow of expanded steam from said second mixing position into said combustion chamber, said regulating element being responsive to the temperature of superheated steam passing from said superheater whereby the amount of expanded steam introduced in said second mixing position controls the temperature of said superheated steam.

8. A method of operating a gas turbine of a gas turbine plant which comprises the steps of
   feeding a flow of water into a chamber,
   introducing combustion air into said chamber under a first pressure to produce hot combustion gas to heat said water,
   superheating said water to steam under a second pressure higher than said first pressure, expanding said steam to a third pressure lower than said second pressure,
   mixing at least a part of said expanded steam with said combustion gas to obtain a mixture of steam and combustion gas, and
   passing said mixture into the gas turbine for expansion therein.

9. A method as set forth in claim 8 wherein said expanded steam prior to mixing is at a temperature lower than the temperature of said mixture upon passing into the gas turbine.

10. A method as set forth in claim 8 which further comprises the steps of
    compressing combustion air for said combustion gas in stages, and
    preheating said flow of water with the compression heat of said combustion air prior to introduction into the chamber.

11. A method as set forth in claim 8 which further comprises the steps of
    exhausting the expanded gas-steam mixture from the gas turbine, and
    preheating said flow of water with said exhausted mixture prior to introduction into the chamber.

12. A method as set forth in claim 8 which further comprises the step of
    mixing another part of said expanded steam with said flow of water prior to introduction of said flow of water into the chamber for preheating said flow of water.

13. A method as set forth in claim 8 wherein said combustion gas includes an excess of air, said excess being smaller than 2:5.

References Cited

UNITED STATES PATENTS

| | | | |
|---|---|---|---|
| 2,869,323 | 1/1959 | Van Nest | 60—39.55 |
| 2,911,789 | 11/1959 | Baker | 60—39.18 |

CARLTON R. CROYLE, *Primary Examiner.*